(12) United States Patent
Sathish et al.

(10) Patent No.: US 9,665,648 B2
(45) Date of Patent: May 30, 2017

(54) METHOD AND APPARATUS FOR A USER INTEREST TOPOLOGY BASED ON SEEDED USER INTEREST MODELING

(75) Inventors: Sailesh Sathish, Tampere (FI); Jilei Tian, Beijing (CN); Rile Hu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 525 days.

(21) Appl. No.: 13/637,001

(22) PCT Filed: Mar. 29, 2010

(86) PCT No.: PCT/CN2010/071378
§ 371 (c)(1),
(2), (4) Date: Sep. 24, 2012

(87) PCT Pub. No.: WO2011/120211
PCT Pub. Date: Oct. 6, 2011

(65) Prior Publication Data
US 2013/0013644 A1  Jan. 10, 2013

(51) Int. Cl.
*G06F 17/30* (2006.01)
(52) U.S. Cl.
CPC .. *G06F 17/30867* (2013.01); *G06F 17/30734* (2013.01)
(58) Field of Classification Search
USPC ............................................ 707/792; 13/792
See application file for complete search history.

(56) References Cited

U.S. PATENT DOCUMENTS

| 6,928,425 | B2 | 8/2005 | Grefenstette et al. |
| 7,058,654 | B1 * | 6/2006 | Burke ............... G06F 17/30864 |
| 2005/0240608 | A1 * | 10/2005 | Jones ................ G06F 17/30324 |
| 2006/0155751 | A1 * | 7/2006 | Geshwind ........... G06F 17/3064 |
| 2007/0156761 | A1 * | 7/2007 | Smith ............... G06F 17/30855 |
| 2007/0185868 | A1 * | 8/2007 | Roth ................ G06F 17/30911 |
| 2007/0208730 | A1 * | 9/2007 | Agichtein ......... G06F 17/30867 |

FOREIGN PATENT DOCUMENTS

WO   2009/026850 A1   3/2009

OTHER PUBLICATIONS

"Latent Dirichlet allocation—wikipedia, the free encyclopedia," document published Mar. 16, 2010, retrieved on Jan. 24, 2014 from web page http://en.wikipedia.org/w/index.php? title=Latent_Dirichlet_allocation&oldid=350185351, 6 pages.

(Continued)

*Primary Examiner* — Tyler Torgrimson
(74) *Attorney, Agent, or Firm* — Ditthavong & Steiner, P.C.

(57) ABSTRACT

Methods and apparatuses are provided for user interest modeling. A method may include receiving an input from a user for specifying one or more topics from among a predetermined hierarchy of topics and subtopics. The method may additionally include retrieving one or more documents associated with the user and extracting language tokens from the documents based, at least in part, on the specified topics. Corresponding apparatuses are also provided.

21 Claims, 10 Drawing Sheets

(56) References Cited

OTHER PUBLICATIONS

He et al, "Keep it Simple with Time: A Reexamination of Probabilistic topic Detection Models," Transactions on Pattern analysis and Machine Intelligence, IEEE, vol. 30, No. 10, dated Jan. 8, 2010, pp. 1795-1808.
Rosen-Zvi et al., "Learning author-topic models from text corpora," ACM Transactions on Information Systems, vol. 28, No. 1, dated Jan. 2010, pp. 4:1-4:38.
Extended European Search Report for corresponding European Application No. 10848672, dated, Feb. 3, 2014, 9 pages.
Office Action for corresponding European Patent Application No. 10 848 672.1-1952, dated Jun. 22, 2016, 7 pages.

\* cited by examiner

METHOD AND APPARATUS FOR A USER INTEREST TOPOLOGY BASED ON SEEDED USER INTEREST MODELING

RELATED APPLICATION

This application was originally filed as PCT Application No. PCT/CN2010/071378 filed Mar. 29, 2010.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. Current and future networking technologies as well as evolved computing devices making use of networking technologies continue to facilitate ease of information transfer and convenience to users. For example, evolved networking technologies and computing devices facilitate accessing a wide array of content from remote content providers for consumption at a user's local computing device as well as exchanging data with other users. Accordingly, to make such technologies, devices, and data exchanges even more relevant to users, service providers and device manufacturers face significant challenges to gaining insight into the characteristics of the user such as behavior, interests, and preferences.

SOME EXAMPLE EMBODIMENTS

Therefore, there is a need for an approach for estimating user characteristics and interests.

In a first example embodiment, a method is provided, which comprises receiving an input from a user for specifying one or more topics from among a predetermined hierarchy of topics and subtopics. The method of this embodiment further comprises retrieving one or more documents associated with the user and extracting language tokens from the documents based, at least in part, on the specified topics. The method of this embodiment further comprises generating a topology of the extracted language tokens according to a probabilistic model, wherein the topology matches the extracted language tokens with the topics and subtopics of the hierarchy.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least receive an input from a user for specifying one or more topics from among a predetermined hierarchy of topics and subtopics. The at least one memory and stored computer program code are configured to, with the at least one processor, further cause the apparatus of this embodiment to retrieve one or more documents associated with the user and extract language tokens from the documents based, at least in part, on the specified topics. The at least one memory and stored computer program code are configured to, with the at least one processor, further cause the apparatus of this embodiment to generate a topology of the extracted language tokens according to a probabilistic model, wherein the topology matches the extracted language tokens with the topics and subtopics of the hierarchy.

In another exemplary embodiment, a computer-readable storage medium carrying one or more sequences of one or more instructions which, when executed by one or more processors, cause an apparatus to at least perform receiving an input from a user for specifying one or more topics from among a predetermined hierarchy of topics and subtopics. The computer-readable program instructions further cause an apparatus to at least perform retrieving one or more documents associated with the user, and extracting language tokens from the documents based, at least in part, on the specified topics. Still further, the computer-readable program instructions cause an apparatus to at least perform generating a topology of the extracted language tokens according to a probabilistic model, wherein the topology matches the extracted language tokens with the topics and subtopics of the hierarchy.

In another example embodiment, an apparatus is provided that comprises means for receiving an input from a user for specifying one or more topics from among a predetermined hierarchy of topics and subtopics. The apparatus of this embodiment further comprises means for retrieving one or more documents associated with the user and for extracting language tokens from the documents based, at least in part, on the specified topics. The apparatus of this embodiment further comprises means for generating a topology of the extracted language tokens according to a probabilistic model, wherein the topology matches the extracted language tokens with the topics and subtopics of the hierarchy.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for seeded modeling of user interests are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "topology" refers to any model, framework or data structure useful for characterizing or organizing a set of related data points. It will be seen in later sections of the description, that the exemplary embodiments herein present a convenient means for enabling data points in the form of user relevant topics and associated subtopics, to be optimally generated. This is of particular importance in performing user interest modeling, user preference analysis, application usage sampling, predictive modeling and any other procedures requiring the selective profiling and/or characterizing of a user's historic behavior or activity within a defined environment. Indeed, it is well known today that user interest modeling techniques can be utilized in a wide range of products and for numerous applications, including but not limited to, e-commerce, mobile device application development, software design, web design, linguistic processing, advanced machine learning techniques, etc.

The following exemplary embodiments are not limited to any one means of application. Furthermore, the exemplary embodiments as presented contemplate the usage of various modeling techniques and algorithms for rendering a user interest based topology, including but not limited to, semantic processing, data tokenization, topical or non-topical Latent Dirichlet Allocation (LDA), topic based tag clustering, etc. While various methods exist today, the examples presented herein overcome some common limitations associated with known techniques for deriving a topology reflective of user interests. These limitations include, but are not limited to:

The generation of both high and low quality tokens as extracted/determined from a document, resulting in token combinations that are not intuitive or practical.

The generation of tokens having little to no useful purpose or information to reveal regarding the item attempted to be modeled as opposed to limiting results to tokens of inherent relevance.

Requiring the user to specify the number of topics a set of tokens is to be associated, or clustered to, as opposed to automating this process.

The inability to enable ready translation of models formulated in accord with one language or syntax to another.

Figure 1:
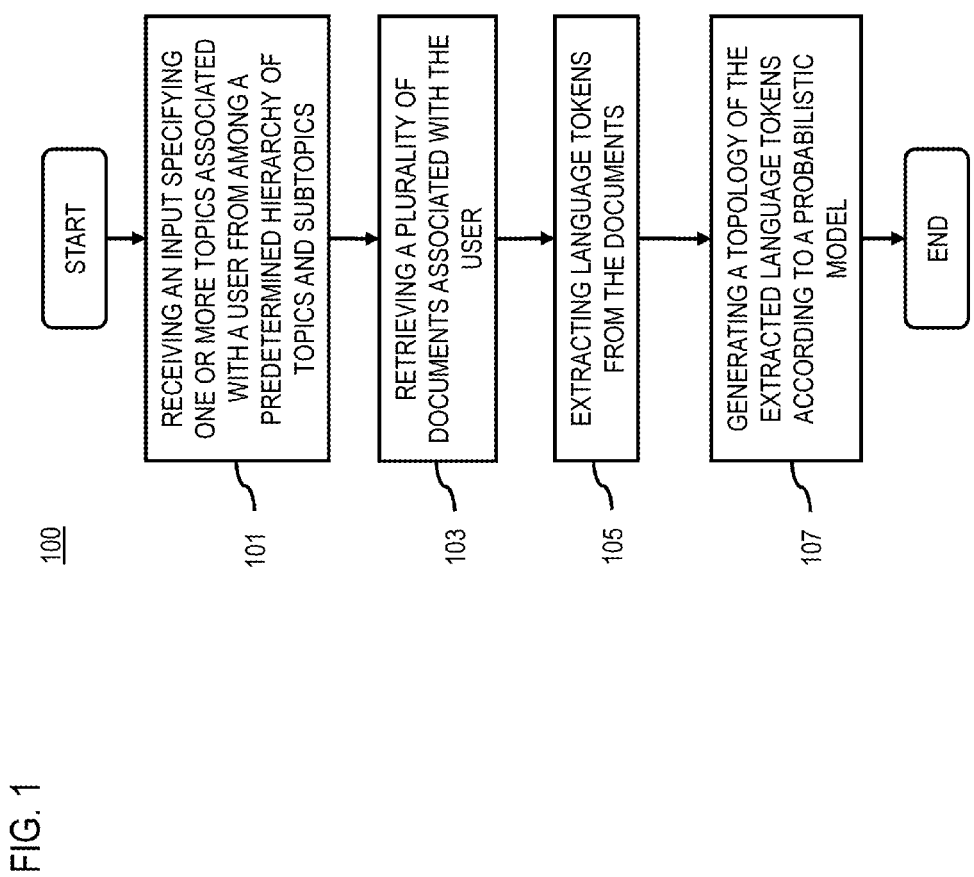
FIG. 1 illustrates a flowchart depicting an example method for generating a topology representing topics of interest to a user relative to a plurality of documents associated with the user, according to an example embodiment of the present invention.

With this in mind, FIG. 1 illustrates a flowchart 100 depicting an example method for generating a topology representing topics of interest to a user relative to representative user-specified topics (e.g., seed topics) and a plurality of documents associated with the user. In the example embodiment, a first step 101 calls for the receiving of an input specifying one or more topics from among a predetermined hierarchy of topics and subtopics to seed the creation of the topology. Once received, pluralities of documents associated with the user are retrieved according to step 103. As a next step 105, the documents are processed to extract language tokens from the documents based, at least in part, on the topics specified by the user in step 101. Finally, as a final step 107, the procedure culminates in the generation of a topology of the extracted language tokens according to a probabilistic model. The topology as generated matches the extracted language tokens with the topics and subtopics of the hierarchy.

Figure 2:
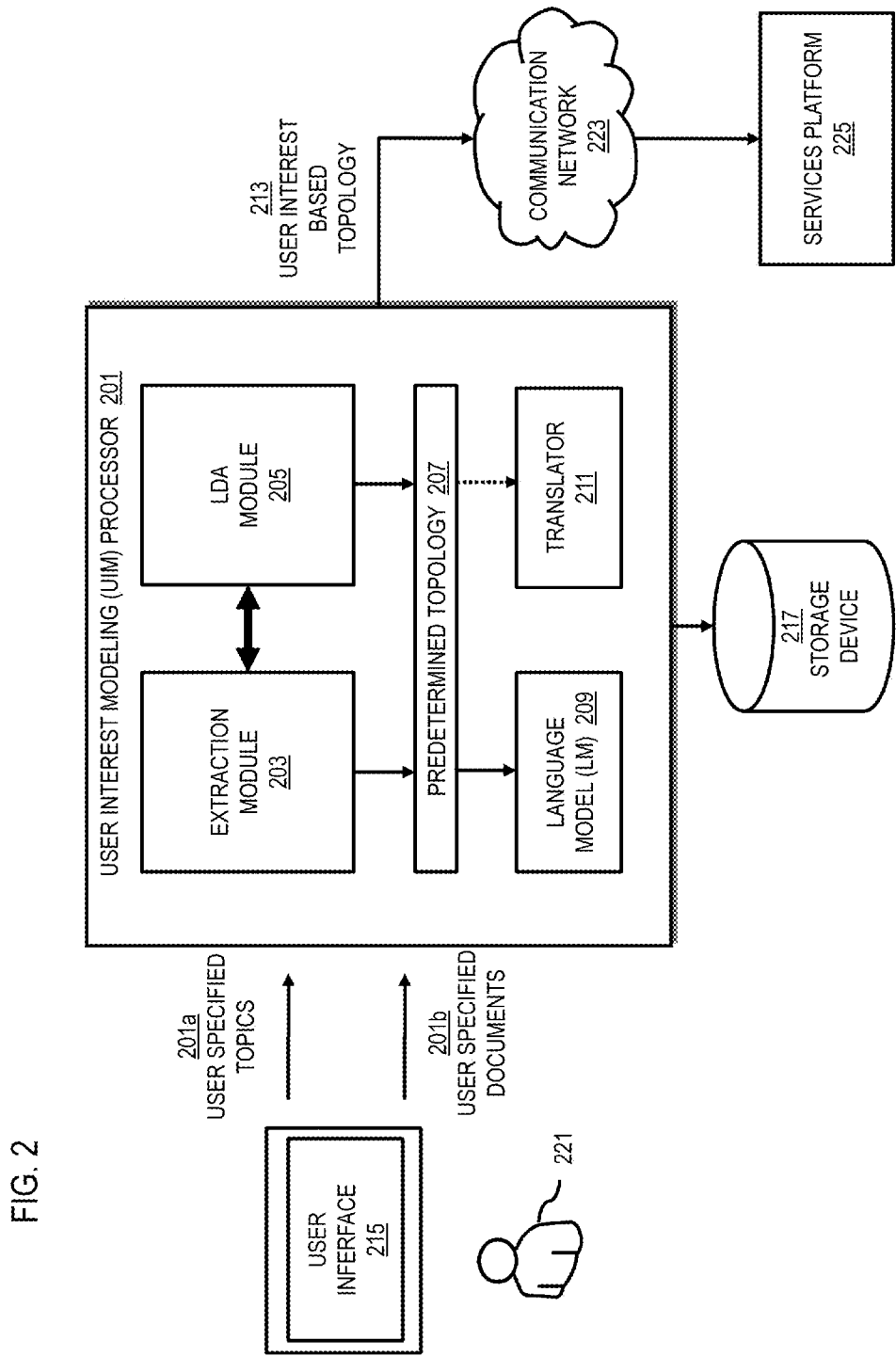
FIG. 2 illustrates a block diagram of an apparatus for generating a topology representing topics of interest to a user relative to a plurality of documents associated with the user, according to an example embodiment of the present invention.
Figure 2A:
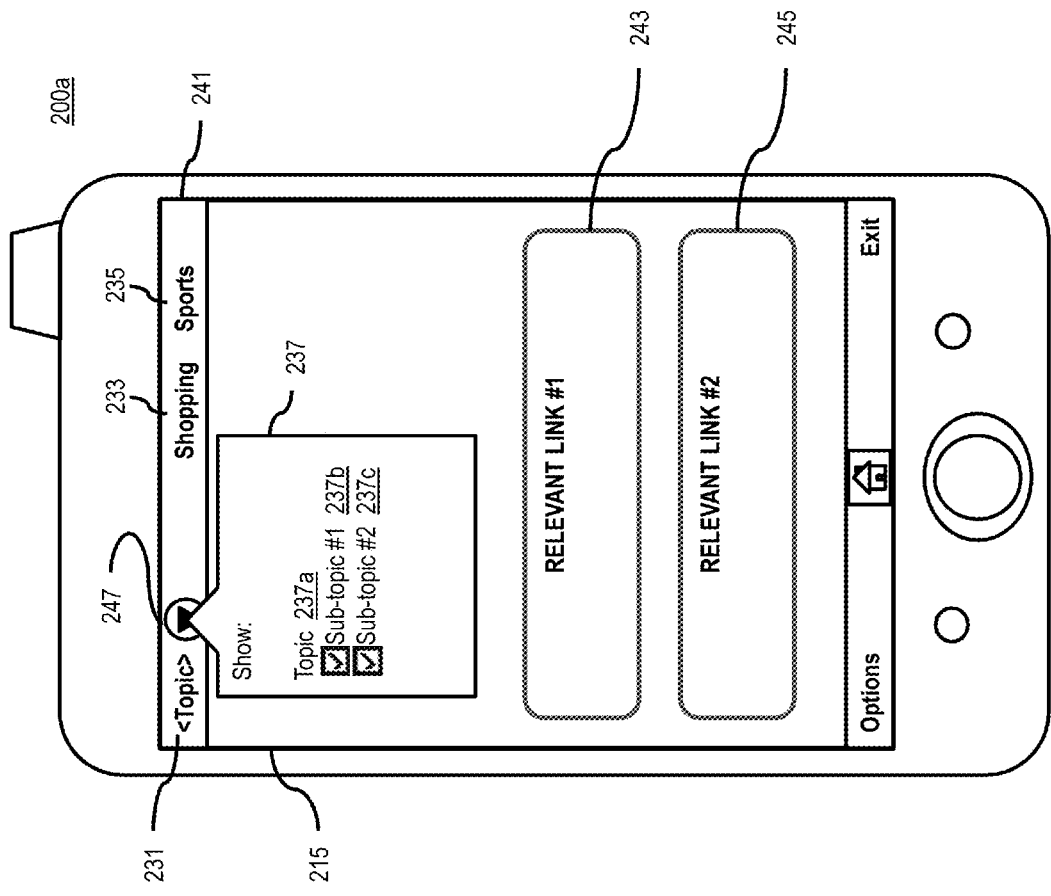
FIG. 2a illustrates exemplary user equipment having a graphical user interface for enabling user interaction with an apparatus for generating a topology representing topics of interest to a user, according to an example embodiment of the present invention.

The above described high-level process is performed on the basis of a user's interaction with a user interest modeling processor, as depicted in FIG. 2. Reference will also be made to FIG. 2a, which depicts exemplary user equipment (UE) 200a having a graphical user interface for enabling user interaction with the user interest modeling processor, according to one embodiment. In particular, FIG. 2 illustrates a block diagram of the user interest modeling processor/apparatus, which generates a topology representing topics of interest to a user 221 relative to a plurality of documents associated with the user (e.g., Internet browsing history, uploaded files, documents available on the user equipment 200a, etc.). As depicted in this embodiment, the user interest modeling (UIM) Processor 201 is a computer-executable module operable and interactive with the user via a graphical user interface 215.

In particular, the UIM Processor 201 is comprised of various executable modules, which in combination, enable effective user interest modeling. The modules include, in general, an extraction module 203 for extracting key words from the various user specified documents 201b provided as input by the user 221, an LDA module 205 for performing Latent Dirichlet Allocation (LDA) modeling based on provided keywords, a predetermined topology 207 implemented as a data file for specifying topics and subtopics relating to user interests, a language model 209 for providing contextual references against the extracted/identified keywords and a translator 211 for enabling proper translation of identified keywords into other languages (e.g., localization processing). More will be presented with respect to each of these modules in subsequent paragraphs, including a description of the interactions between them that enable effective user interest modeling.

The user 221 provides as input to the UIM Processor 201, via visual, object-oriented or manual/command line based modes of entry or selection, one or more topics 201a pertaining to user interests. By way of example, the user-specified topics 201a are selected from a predetermined hierarchy of available topics and subtopics that relate to various interest categories such as the predetermined topology 207. In the instance of a GUI associated with the UIM Processor 201, the user 221 can select/specify topics and/or subtopics of interest to provide as input from a provided drop-down menu 257 featuring available choices. The user 221 can activate the drop-down menu 257, such as by clicking a drop-down activation button 253 available from a top-level category toolbar 241.

In addition to providing as input to the UIM Processor 201, one or more specified user topics 201a, the user 221 specifies pluralities of documents of interest to the user 221 for processing, analyzing and automatically modeling. Document types specified can include, but is not limited to, word processing documents, text messages, e-mail communications, graphic files, instruction code, web-page data and any other file types executable via user equipment 200a (e.g., a wireless mobile device) or over a communication network 223. Again, files may be selected for input via the graphical user interface 215 accordingly of FIG. 2a, and pulled for example from an accessible storage device 217 of the device 200a or remotely via the network 223. While not shown in FIG. 2a, files may be selected from a local storage of the user equipment 200a via a directory search utility (e.g., Windows Explorer). In another embodiment, the UIM Processor 201 may search for and retrieve documents associated with the user 221 from the Internet or other content sources (not shown) available over the communication network 223.

In one embodiment, the topics 201a provided by the user is a list of descriptors, variables, categories or terms intended to classify or characterize one or more user characteristics, interests, preferences or related information. In one embodiment, the user 221 may select any representative number of topics at, for instance, the highest levels of the predetermined topology 207 (e.g., root topics) to seed the approach to user characteristic modeling described herein. In this way, the approach described herein advantageously reduces the burden (e.g., computing resources, network bandwidth, etc.) associated with otherwise having to manually specify an exhaustive list of user characteristics. While means of implementation will vary, in general the user 221 can select from a list of these predetermined topical categories directly via the interface 215.

As noted, topics provided by the user 221 correspond to the predetermined topology 207 (e.g., a predetermined hierarchy of topics and subtopics). As such, the UIM Processor 201 is able to leverage the knowledge of the user 221 upfront (e.g., based on the user's manual selection of topics describing user interests), prior to processing of any documents, to better direct the analysis of documents against the predetermined topology 207 to generate the user interest based topology 213. In one embodiment, this user interest based topology 213 represents the set of topics and subtopics in the predetermined topology 207 that best reflect user interests. In other words, the approach described herein combines a manual topic seeding process followed by an automated probabilistic determination of relevant topics and subtopics to advantageously provide a more relevant modeling of user interests, characteristics, and/or preferences.

In one embodiment, the user interest based topology 213 can then be transmitted over the communication network 223 to a services platform 225 for customizing applications, services, content, preferences, and the like presented to the user 221. For example, if one of the services is an advertisement engine or server, the user interest based topology 213 can be used to select and/or tailor advertisements that are directed to the user 221. In another example, the topology 213 can be used to specify preferences in services or applications (e.g., favorite types of points-of-interests in a navigation service). An exemplary use case depicting the execution of a user interest based topology by a services platform to fulfill a real-world user request is presented with respect to FIGS. 2a-2c.

In the first use case of FIG. 2a, the user interface 215 presents various top-level topics 233 and 235 that are selectable by the user 221, the topics being presented to the user based on the topology 213. A services platform 225 makes use of the generated topology 213 to provide customized content and topics to the user interface 215. In addition, the services platform is able to generate or retrieve content of interest to the user based on their detected topical wants, criteria, informational trends, document characteristics, common search profiles, informational tendencies, etc. Resultantly, the user 211 can select from various topics or content as returned for presentment via a user-centric top-level category toolbar 241.

The top-level category toolbar 241 features a topic selection indicator 231, from which the user can select various topics of interest via drop-down menu 237. The drop-down menu 237 is invoked by the user through activation of a drop-down menu button 247. Featured within the menu are various topics 237a and sub-topics 237b and 237c the user can select from by way of checkbox. Selection of a particular checkbox topic results in them being featured as toolbar options within the top-level category toolbar 241. When a user selects a topic from the toolbar, the services platform generates/retrieves/renders content to the interface 215 that are pertinent to the topic. So, in the example as shown, the user selected "Shopping" or "Sports" from the menu 237, resulting in the placement of these topics 233 and 235 within the toolbar.

User selection of topics results in presentment of relevant results data—i.e., relevant links 243 and 245. So, for example, when the user selects topic 233 "Shopping," content associated with shopping is shown (e.g., "Great Shopping at your local Macy's Department Store"). The provided link to Macy's, a department store local to the user 221, is provided because the generated topology enabled the services platform to automatically direct the user to "Shopping" content (e.g., relevant links 243 and 245). Intuitive results such as "local Macy's Department Store" are achieved utilizing known user 221 profile, address, proximity, geo-spatial, historical and/or other behavioral data.

Figure 2C:
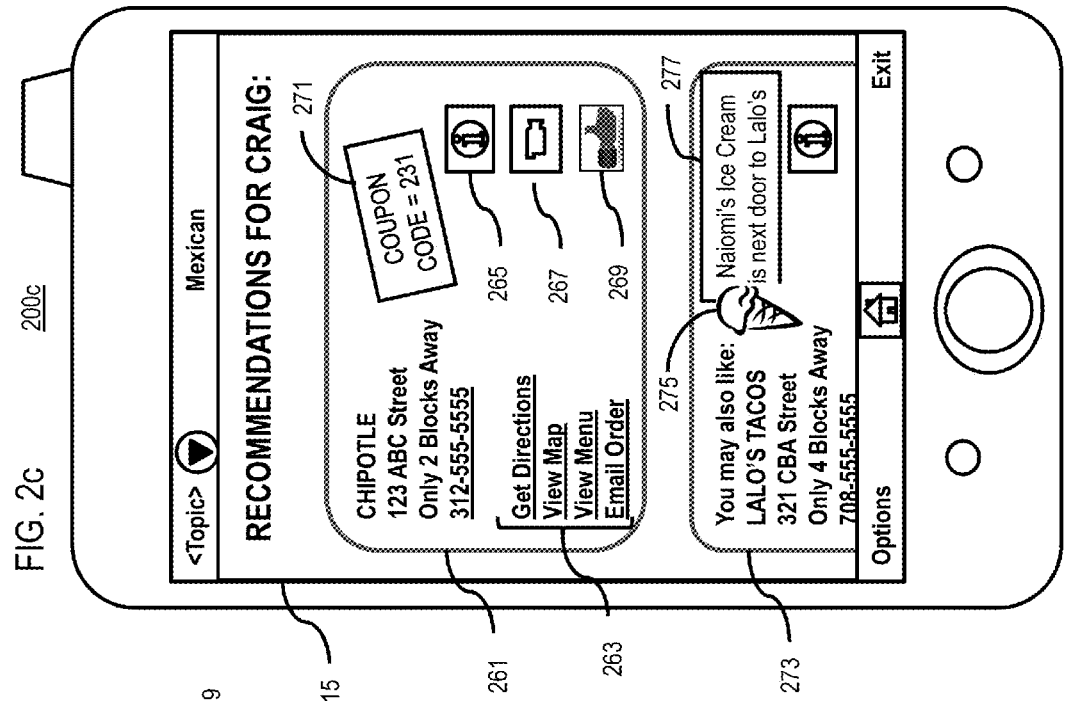
FIGS. 2b and 2c illustrate exemplary uses of user equipment having a graphical user interface for enabling user interaction with an apparatus for generating a topology representing topics of interest to a user, according to an example embodiment of the present invention.
Figure 2B:
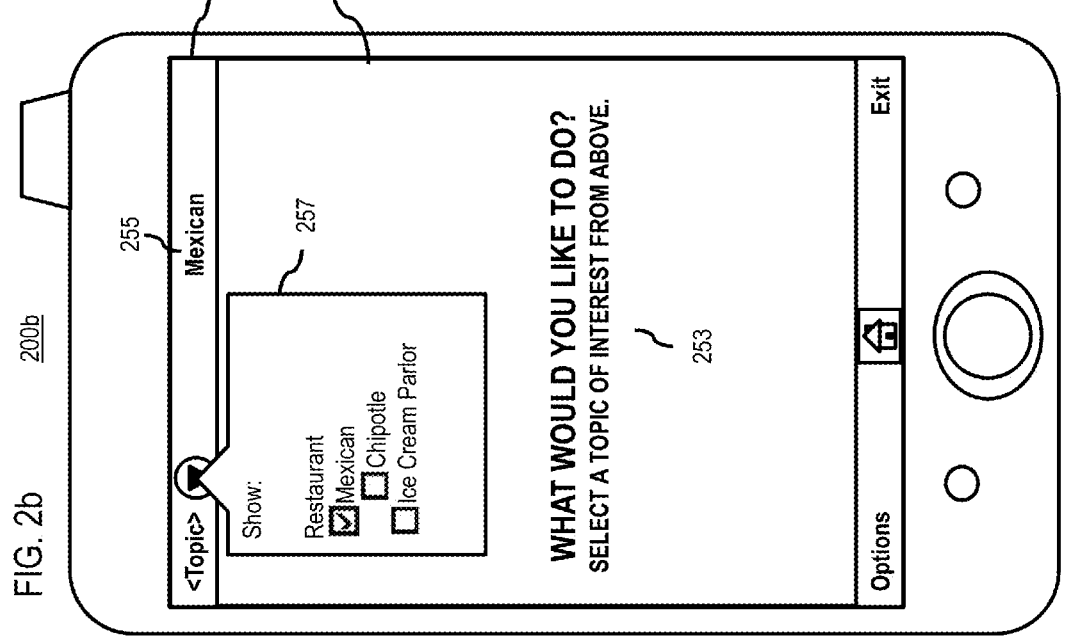

Consider a second use case of FIG. 2b, wherein a user of a mobile device wants to identify restaurants in close proximity to their current location. Utilizing geo-spatial/location data and the user generated topology, the user request is fulfilled.

In particular, the user interest based topology allows the services platform 225 to identify restaurants based on genres most likely to appeal to the user. The user would launch an application from their mobile device 200a, such as a portal or web service, enabling them to engage with the services platform 225. Initially, the interface 215 would prompt the user to select one or more topics of interest to engage a query of relevant content—i.e., by way of an intro message 253. The user topology, in this example, for the top-level topic of "Restaurants" specified that the user has a preference for "Ice Cream Parlors" and "Mexican" cuisine, particularly "Chipotle." Resultantly, these interests are reflected in the drop-down menu 257 for the user's convenience.

Once the user selects a topic (e.g., Mexican), this category 255 is featured in the toolbar 259. Based on this selection, and accounting for the present moment whereabouts of the user, relevant content of various forms are presented to the user (Craig), as depicted in FIG. 2c. As a first recommendation 261 for Craig, a Chipotle restaurant is identified. As shown in FIG. 2b, Chipotle happens to be a restaurant corresponding to the user based topology, and of high relevancy (entropy). Hence, this content is featured first, with details including but not limited to: the name of the venue, the address, relative distance away from the user, a link enabled phone number. Various user options 263 are selectable by the user via the interface as well for this recommendation/content 261, including but not limited to a link for activating directions to the venue, a link to activate a map, a link to activate a menu, a link to activate an e-mail order. Other content may also include actionable icon 265 for obtaining information about the venue, actionable icon 267 for enabling a commercial to be shown for the venue and actionable icon 269 for accessing user review information. As yet another form of content, a coupon code 271 is provided so as to further incent user patronage.

Another recommendation 273 is also provided by the services platform based on detected user interest. In this case, Lalo's Tacos is the restaurant presented to the user, featuring several of the above described information, user options and other content, where applicable. Of particular interest to the user is helpful tip content 277 for conveying additional data that can be help the user act upon a provided recommendation. As the user's topical interests in the arena of restaurants also included ice cream parlors, the helpful tip prompts the user that an ice cream parlor (Naiomi's Ice Cream) is next door to the recommended Mexican restaurant. Graphical content 275 is also provided in relation to this topological preference. Thus, while the selected category for this user is Mexican 255, the services platform 225 is able to render content of additional value based on known interests and within the correct context.

Indeed, various other use case scenarios may be considered within the context of the techniques and concepts herein. While content may be rendered to the interface 215 in a myriad of forms, certain content is based on coordination between the services platform and the venue in question. For example, the coupon code 271 must be provided with the permission of Chipotle, as well as the ability to view a menu or e-mail in an order. Hence, some venues may feature content that is not applicable to other venues. As such, the services platform 225 provides an intelligence based platform/interface for both the user desiring relevant and timely content and a venue/company/service provider desiring to entice those users. All of the above described interactions between the services platform 225 and the user occur in real-time via a communication network 223.

By way of example, the communication network 223 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the user interface 215, the UIM Processor 201, and storage device 217 are resident in user equipment (UE), such as that depicted in FIG. 2a. While any interface ready equipment is within the scope of the examples presented, the UE is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE can support any type of interface to the user (such as "wearable" circuitry, etc.).

By way of example, the UE and its components (e.g., the UIM Processor 201) communication with the services platform 225 or other components of the communication network 223 using well known, new or still developing protocols. In this context, a protocol includes a set of rules defining how the network nodes within the communication network 223 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 3:
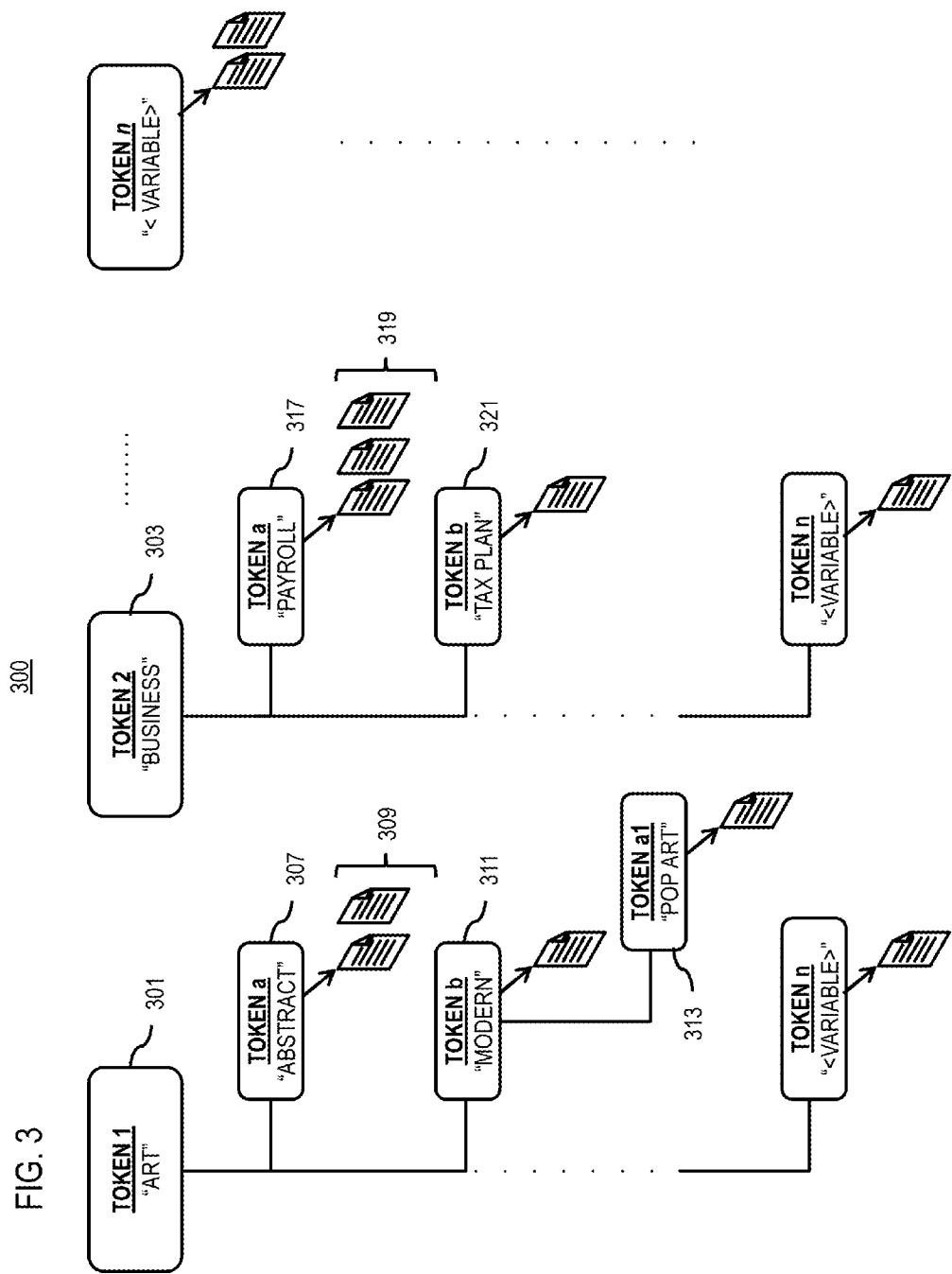
FIG. 3 illustrates a graphical representation of a predetermined topology comprising a plurality of language tokens, according to an example embodiment of the present invention.

FIG. 3 illustrates a graphical representation of the predetermined topology 207 of FIG. 2, comprising a plurality of language tokens, according to an example embodiment of the present invention. The topology is implemented as a data file, organized in accordance with a precise data structure so as to be readily interpreted, analyzed, reconstructed or deconstructed. Within this data file are one or more representative topics of user interest, wherein each topic is a composite token. In the context of the present examples, a "token" is a single data point or variable within a representative set 300 of common data points. As such, the set of tokens comprising the topology define a fixed, but expandable, set of potential user interest topics. For the sake of clarity, the term "token" and "topic" will be recognized as synonymous terms, as the computational or semantic processing of the topology data file ultimately results in abstraction of the topics into one or more tokens.

Generally, a token can be a keyword, an operator, punctuation mark or any combination of words and/or characters comprising an input string or input document. In the context of the present example, each top level topic 301, 303 through 323 represent a pre-defined number of noun tokens—i.e., 15 top level tokens. Hence, each descriptor variable of a given token is semantically recognized as a noun, i.e., "Art," "Business," etc. Each topic is further divided into one or more subclasses for further organization into subtopics. The predetermined topology 300 is thus hierarchically arranged, such that a defined/controlled number of top-level topical tokens 301, 303 and 323 (e.g., topics) have respective subcategories 307, 311, 313, 317 and 321 (e.g., subtopics). Subclasses of a given topic 301, 303 and 323 within the hierarchy can go down multiple depths and levels (further subclasses), representing, for instance, anywhere between 30-50 tokens depending on the nature of the top-level category.

With this in mind, it is not uncommon for the predetermined topology 300 of topics and subtopics of user interest to represent a super-set of at least 750 tags or topics. Typically, the user interest would belong to one or more (say 5) of the top classes (e.g., topics, categories) and then several of the sub-classes under each class that the user has chosen. Of course, it is impractical for a user to manually perform such categorization of documents into topics and subtopics with such granularity and precision. Furthermore, the hypothetically presented number of 750 tokens is by way of example, not limitation. The number of tokens will grow as the granularity of topics rise and as new genres get identified or refined over time. Therefore, means for automation of this process following manual seeding of, for instance, one or more top level topics as provided herein is necessary.

With reference again to FIG. 3, each token within the topographical set 300 is also associated with a corresponding set of reference tokens. The set of reference tokens represents one or more tokens abstracted from a reference document assigned to each topic and subtopic of the predetermined topology. The reference document is a resource that is determined to closely match the subject matter represented by the corresponding topic. As such, a reference document provides a means of enabling contextual correlation between the topical token and its actual semantic use. So, for example, Token 307 for the noun "ABSTRACT," has two associated documents 309, each of which would pertain to the subject matter of abstract art. Token 317 for noun "PAYROLL," has 3 associated documents 319, each of which would pertain to the subject matter of payroll in the context of business. By way of example, the documents 319 may be specified from one or more online document repositories (e.g., Wikipedia or any other source) providing topic-related documents. In one embodiment, the UIM Processor 201 can extract a set of reference tokens from each reference document to represent the topic and serve as a basis for probability matching of tokens extracted from user documents 201b using the topic models and methods described in the co-pending application "Methods and Apparatuses for User Interest Modeling," PCT Application No. PCT/CN2009/076355, filed Dec. 31, 2009, which is incorporated herein in its entirety. In combination, the representative tokens abstracted from each individual reference document act as a language model (LM) 209, providing language specific information that can be used for deriving contextually accurate and relevant tokens representative of the user documents 101b submitted to the UIM Processor 201. It will be generally recognized by skilled artisans that while the illustration depicts various documents in association with a given token, indeed, this implicates a mapping of complimentary reference tokens as well.

In addition to the predetermined topology 207 and its associated language module (LM) 209, the UIM Processor 201 also comprises an extraction module 103 and a latent Dirichlet allocation (LDA) module 205. In particular, the extraction module 203 and LDA Module 205 leverage the tokens presented by way of the predetermined topology and reference documents (language model 209) to perform advanced analysis.

In particular, the function of the extraction module 203 is to parse and tokenize the various user specified documents 201b provided as input by the user 221. In addition, the extraction module 203 executes logic to determine which of the specified documents 201b correlate to the user specified topics 101a.

Figure 4B:
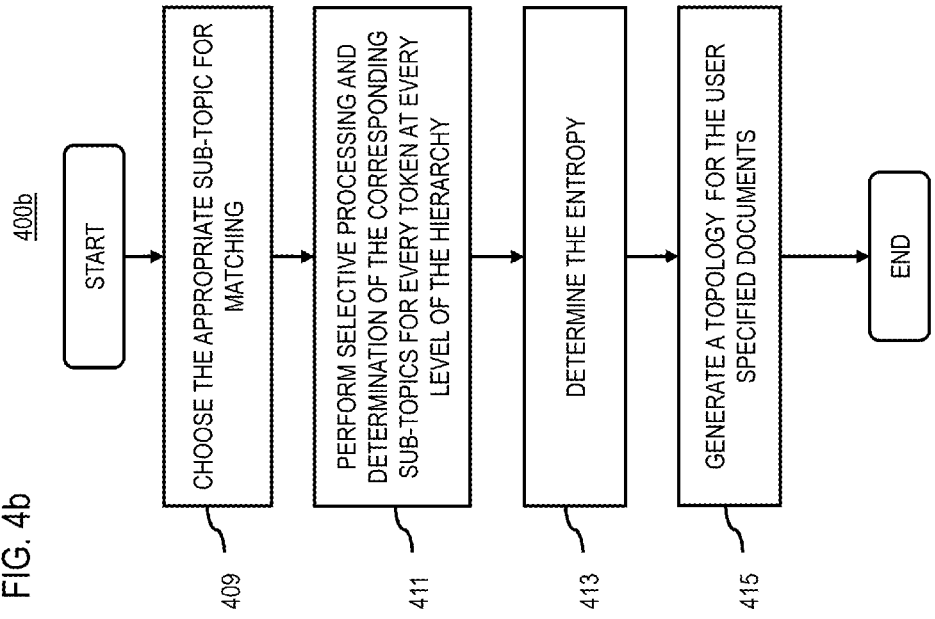
FIG. 4b illustrates a flowchart depicting an example method for enabling a user to match user specified tokens to a predetermined topology for generating a topology representative of a plurality of documents, according to an example embodiment of the invention.
Figure 4A:
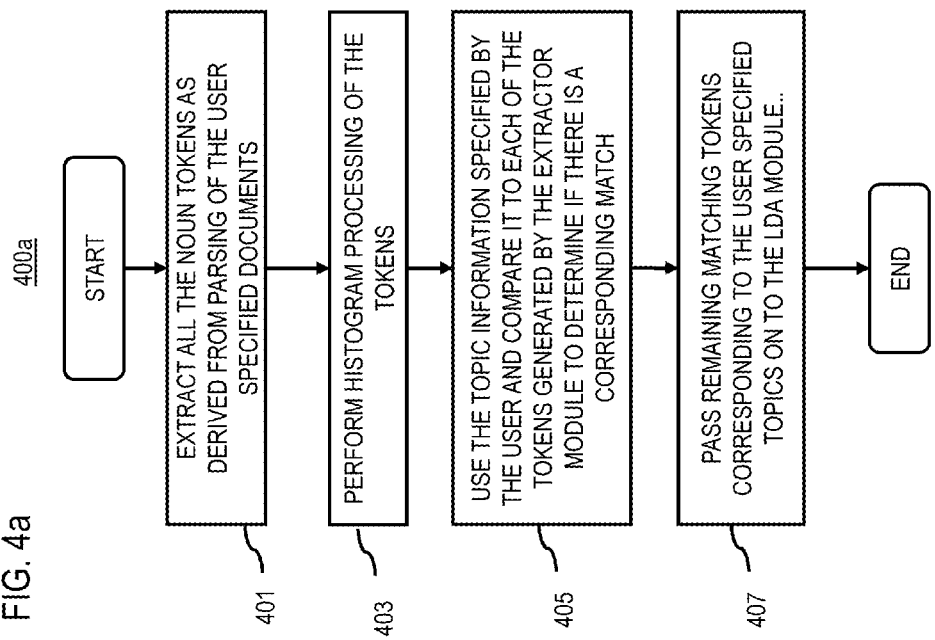
FIG. 4a illustrates a flowchart depicting an example method for enabling a user to extract language tokens from a plurality of documents based, at least in part, on user specified topics, according to an example embodiment of the present invention.
Figure 7:
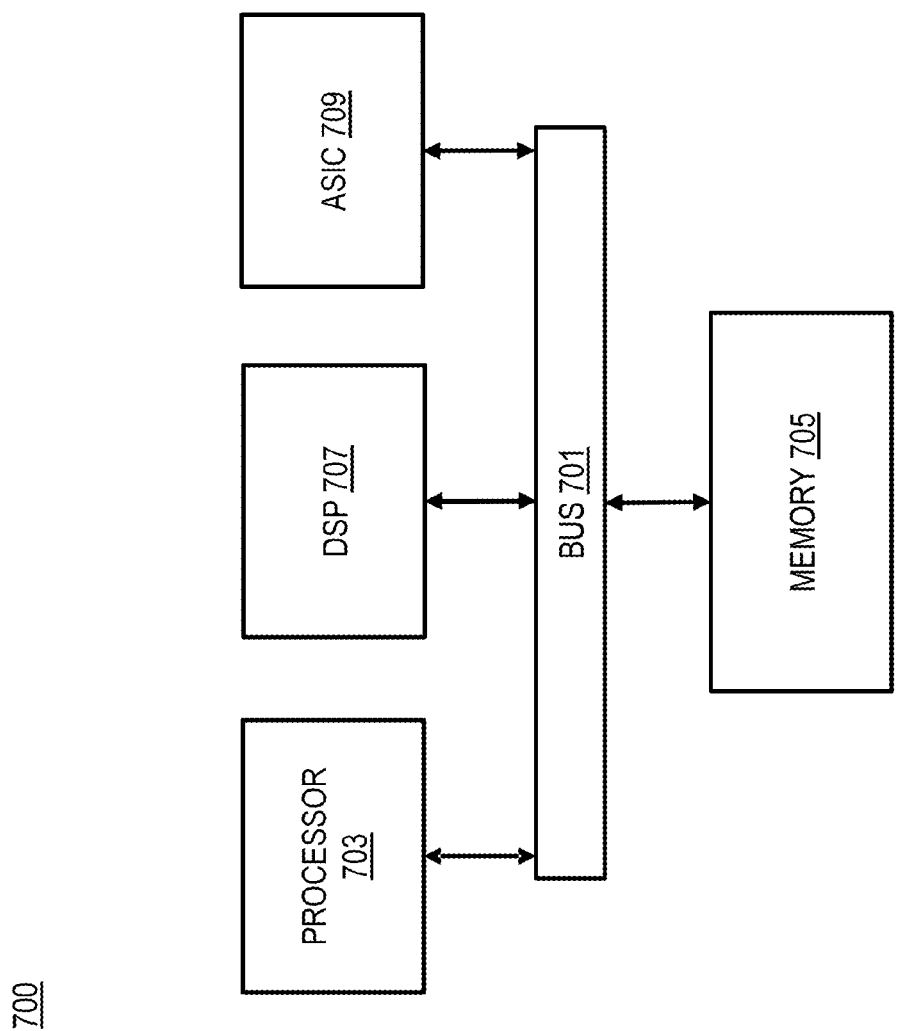
FIG. 7 is a diagram of a chip set that can be used to implement an embodiment of the invention.

FIG. 4a presents a flowchart depicting the exemplary logical process 400a by which the extraction module 103 extracts language tokens from a plurality of documents based, at least in part, on user specified topics. In one embodiment, the UIM Processor 201 performs the process of FIG. 4a and is implemented in, for instance, a chip set including a processor and a memory as shown in FIG. 7.

As first steps 401 and 403 respectively of the exemplary embodiment, the extraction module 203 extracts all the noun tokens as derived from parsing of the user specified documents, then performs histogram processing of said tokens. The end result of histogram processing is a list of only the rarer, most pertinent tokens/words. In particular, the histogram flags all frequently used words, so as to avoid the usage of common nouns that do not fundamentally characterize the document.

As a next step 405, the extraction module 203 then uses the topic information 201a specified by user 221 and compares it to the tokens generated by the extraction module 203 to determine if there is a corresponding match. As a result, the extraction module outputs to the LDA module 205 only those tokens representing a match for a given user specified topic. This analysis process can be carried out for all tokens in one of two iterative modes, presented below.

In the first mode, the tokens abstracted are compared with the first user specified topic against the LM 209. If the probabilistic matching distance between a subject token and the first user specified topic exceeds a predetermined threshold, those tokens are flagged as not belonging to the topic. The tags that are ignored are then used for comparison against the next topic and so forth—i.e., once compared against the "Art" Token 301, compare against the "Business" Token 303. The advantage of this implementation is that there are less token/tag sets to compare for each iteration versus the previous one. The disadvantage is that some information for engaging comparative processing may be lost due to loss of some tags to a previous iteration.

In the second approach, all tokens resulting from this initial stage of processing are chosen irrespective of whether they are matched to a user specified topic in the previous iteration or not. The advantage to this approach is zero loss of tokens/tag sets, which maximizes the comparative processing result. However, the disadvantage is the greater processing required to execute such processing versus the prior approach. Depending on the capabilities of the processor, however, iterations may be performed concurrently so as to minimize processing time.

At the end of this process 400a, only those tags remain that belong to one or more categories the user has specified. Each category that the user has chosen is now left with a set of tags extracted from user knowledge base. Note that for the sake of simplicity, the example embodiment as depicted assumes a best case scenario. Hence, while no logic is depicted to represent the comparative matching process of step 405, it is to be assumed that a "no match" determination would result in no use of the corresponding token. The user could be alerted, say via the user interface 215, of matches vs. non-matches as they occurred or upon performance of all necessary iterations.

FIG. 4b illustrates a flowchart depicting an example method for enabling a user to match user specified tokens to a predetermined topology for generating a topology representative of the plurality of user specified documents 201b. According to the example embodiment, the next stage of processing 400b involves the LDA Module 205 of FIG. 2. In one embodiment, the LDA Module 205 is implemented in, for instance, a chip set including a processor and a memory as shown in FIG. 7.

The Latent Dirichlet Allocation (LDA) module 205 is a full probabilistic generative modeling algorithm having mathematical modeling capability. The computational complexity of LDA algorithm is not directly influenced by the quantity of documents input into the model, making it suitable and scalable for large-scaled corpus. Alternatively, an improved LDA model, referred to herein as LLDA-TF (Labeled Latent Dirichlet Allocation with Topic Feature), may also be employed as the LDA Module 205. It will be appreciated, however, that LDA and LLDA-TF are merely examples of an embodiment of a topic model configured to utilize topic features in accordance with embodiments of the invention. Accordingly, where the LDA Module 205 is described, the invention contemplates any topic model configured to act upon one or more seed documents generated from a topic feature.

With this in mind, having received the tokens representative of documents matching the user specified topics, the LDA Module 205 first chooses the appropriate sub-topic for matching of the user specified tokens against the predetermined topology 407, corresponding to step 409. As a next step 411, the LDA Module 205 then takes the set of tokens that belong to the selected sub-tree (a branch of hierarchically aligned tokens/topics—e.g., parent node at the top followed by nested children nodes at multiple levels below) and iterates through the token set to generate sub-clusters pertaining to specific sub-topics depicted by sub-nodes in the sub-tree. More specifically, having determined the top-level matching tokens for the documents based on user specified topics, the LDA Module 205 performs selective processing and determination of corresponding sub-topics for every token at every level of the hierarchy. This process is described by way of example in the following paragraphs.

It will be recognized, however, that various other means of implementation are within the scope of the examples presented herein.

For the first example, assume the LDA Module 205 first chooses the second level of the hierarchy. Also, assume there are 3 sub-topics and another 4 sub-topics within each of the sub-topics at the second level. Altogether, there are three levels for that particular sub-tree, including the top-level token. Since there are 3 sub-topics at the second level, the LDA Module 205 can first cluster the tag set into three topics (complimentary tokens)—e.g., performing one or more iterations for generating the three topical tokens. After a set number of iterations are performed, a three cluster confidence metric for each cluster against a particular topic/token within the pre-determined topology is checked. When the confidence score for any cluster falls below a threshold, the sub-topic being compared is ignored and the tags are added to the other tag sets within the sub-tree. A new iteration is performed for subsequent sub-topics and nodes within the sub-tree.

Alternatively, in the second example, the LDA Module 205 can also decide to ignore those tags that failed to meet the confidence criteria for the subsequent iteration. In this way, only two tag clusters will remain for comparison against the pre-determined topology. If the confidence score for each respective tag set towards its sub-topic falls above the threshold, the tag sets are assigned to that sub-topic. Otherwise, the same process continues.

In both of the above presented examples, the confidence metric is based on matching the extracted language tokens with the set of reference language tokens of the predetermined topology and associating the extracted language tokens with the one topic or subtopic based on the matching. As mentioned earlier, usage of the reference tokens enables a degree of contextual relevance to be ascertained. The confidence scores as derived represents an entropy measure—the extent to which the variety of the topics and subtopics matched to the extracted language tokens in the topology. This corresponds to step 413 of the embodiment. An exemplary means for calculating entropy is:

Entropy=Sum[(probability of a token matching a topic)×log(probability of a token matching a topic)] for all potentially matching topics and subtopics.

Of course, any suitable formula for enhancing the probability and surety of tokens relative to user interest is within the scope of the exemplary techniques presented by the various embodiments.

Thus, the LDA Module 205 determines how many topics there are in a given tag set and maps accordingly to the predetermined topology. The resulting output is a generated topology 213 that corresponds directly to the document specified by the user, based at least in part on the user specified topics 401a. The generated topology 213 may also be based upon the extent of entropy, wherein the degree to which multiple topics and subtopics match given token is a good indicator of the relevance and usefulness of said token. This final step of generating the topology corresponds to step 415.

Note that for the sake of simplicity, the example embodiment as depicted assumes a best case scenario. Hence, while no logic is depicted to represent the comparative matching process of step 411, it is to be assumed that a "no match" determination would result in no use of the corresponding token. The user could be alerted, say via the user interface 215, of matches vs. non-matches as they occurred or upon performance of all necessary iterations.

Figure 5:
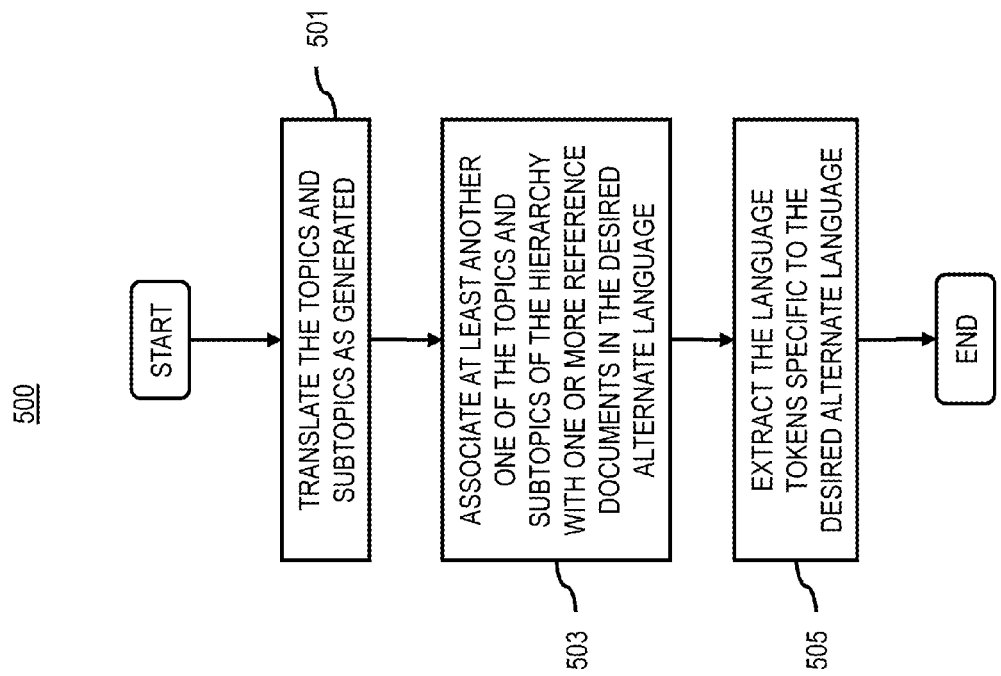
FIG. 5 is a diagram of a flowchart depicting an example method for generating the topology based at least in part on language considerations.

As yet another embodiment, a means for generating the topology 213 based at least in part on language considerations is presented in FIG. 5. Hence, the final output to the UIM Processor 201 may account for differences in syntax, language and general word usage between complimentary sets of tokens. Specifically, the steps 500 as presented may be performed in conjunction with a translator 211 having various executable instructions for translating tokens (e.g., a localization module). In one embodiment, the translator 211 is implemented in, for instance, a chip set including a processor and a memory as shown in FIG. 7.

As a first step 501, the translator 211 translates the topics and subtopics as generated via steps 401b into the desired alternate language. As a next step 503, the LDA Module 205 operating in connection with the translator 211 associates at least another one of the topics and subtopics of the hierarchy with one or more reference documents in the desired alternate language. As yet another step 505, the language tokens specific to the desired alternate language are extracted. In this way, the generating of the topology 213 further comprises, at least in part, matching the extracted language tokens with the set of reference language tokens in the alternate language.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, some embodiments of the invention provide several advantages to service providers, content providers, computing devices and computing device users. Embodiments of the invention provide for the determination of user interest topics defining a user's interests. Embodiments of the invention facilitate leveraging determined user interest topics for providing targeted content, such as, for example, targeted advertising to users. In this regard, embodiments of the invention mine logged interactive user history data to determine user interest topics for a user. In accordance with some embodiments of the invention, the logged interactive user history data comprises data produced, received, and/or accessed by a user in the course of everyday use of a computing device.

As patterns of usage of a device by the user may reflect a user's interests, embodiments of the invention provide for automated modeling of interactive user history data by way of a novel topic model configured to act upon one or more user specified topics and seed documents. In accordance with embodiments of the invention, predefined topic category labels comprising human readable and understandable names are determined through generation of a User Interest Modeling (UIM) framework that can be used by any application. The exemplary embodiments also address the problem of enabling easy transference of a generated framework for use in applications having different language requirements.

The processes described herein for providing seeded modeling of user interests may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
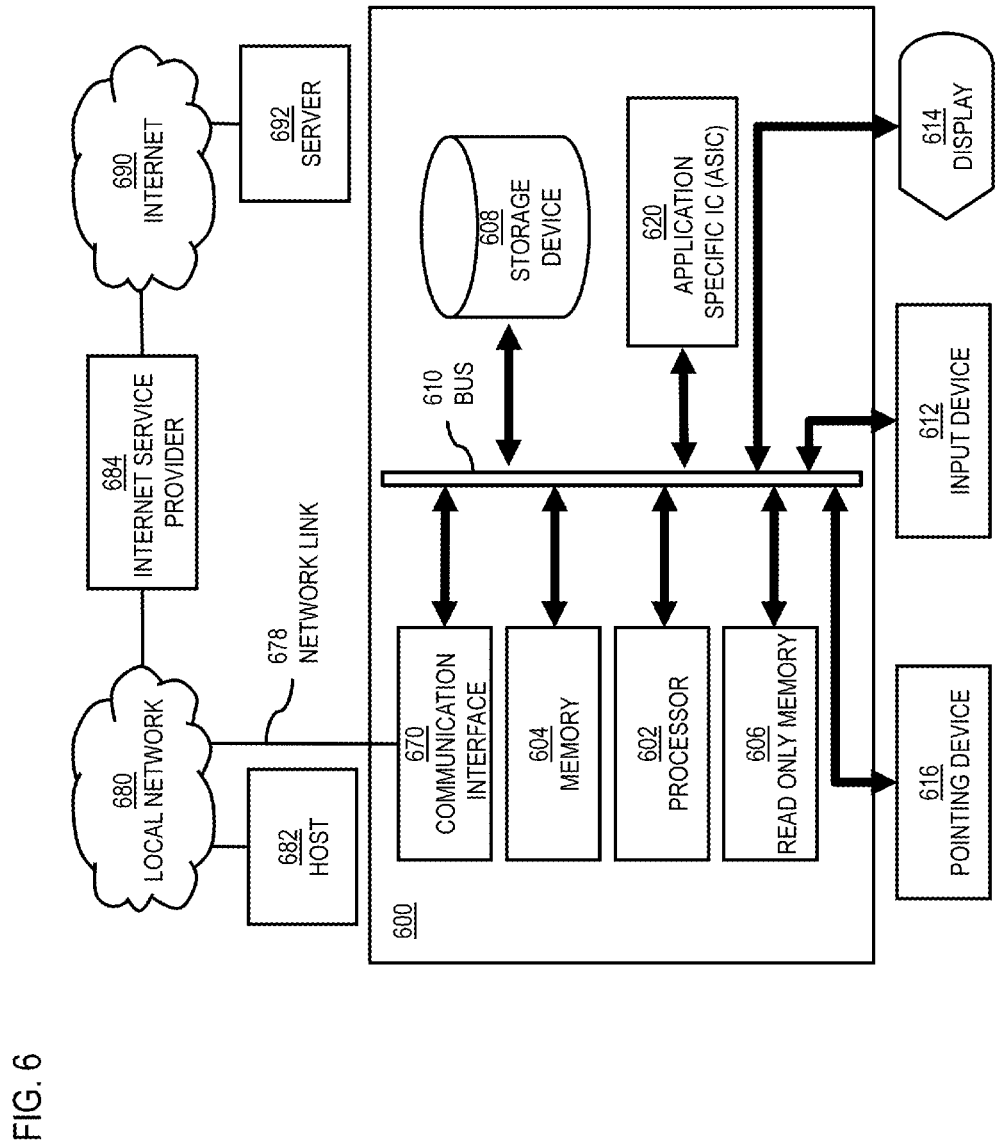
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide seeded modeling of user interests as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing seeded modeling of user interests.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide seeded modeling of user interests. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing seeded modeling of user interests. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing seeded modeling of user interests, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 223 for providing seeded modeling of user interests to the UE.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide seeded modeling of user interests as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of providing seeded modeling of user interests.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide seeded modeling of user interests. The memory 705 also stores the data associated with or generated by the execution of the inventive steps.

Figure 8:
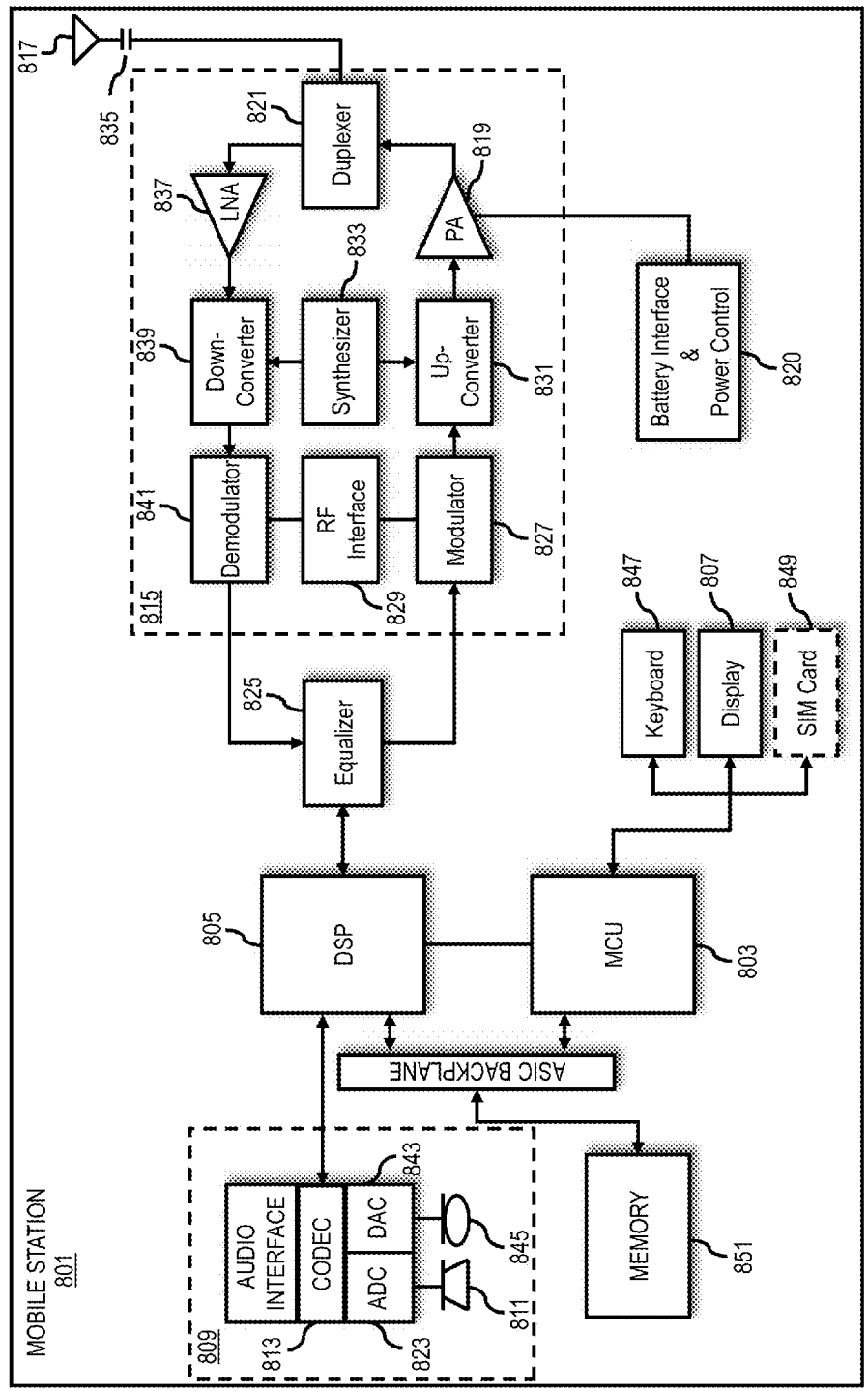
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating communication network 223, according to one embodiment. In some embodiments, mobile terminal 800, or a portion thereof, constitutes a means for performing one or more steps of providing seeded modeling of user interests. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing seeded modeling of user interests. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide seeded modeling of user interests. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention, In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    providing, on a user interface associated with an apparatus, a presentation of a menu of one or more topics from among a predetermined hierarchy of topics and subtopics to a user;
    receiving, via the user interface by the apparatus, a first input from the user specifying at least one of the one or more topics from among the predetermined hierarchy of topics and subtopics;
    retrieving, by the apparatus, one or more documents associated with the user;
    extracting, by the apparatus, noun tokens from the documents based, at least in part, on the specified topics;
    performing, by the apparatus, histogram processing of the extracted noun tokens to provide a list of pertinent tokens;
    comparing, by the apparatus, topic input information received from the user with the list of pertinent tokens to determine if there is a corresponding match;
    generating, by the apparatus, a topology of the matching tokens according to a probabilistic model, wherein the topology matches the matching pertinent tokens with the topics and subtopics of the hierarchy;
    providing, on the user interface by the apparatus, a presentation of top-level topics as topic icons on a tool bar on the user interface based, at least in part, on the topology of matching tokens; and
    in response to a second input from the user specifying one of the topic icons, providing, on the user interface by the apparatus, a presentation of one or more search results customized for the user using machine learning based on the topology.

2. A method of claim 1, wherein the extracting of the noun tokens comprises:
    identifying substantially all noun tokens in the documents;
    selecting one of the identified noun tokens based, at least in part, on whether the one identified noun token is semantically related to the specified topics, wherein the extracted noun tokens include the selected one identified noun token;
    providing, on the user interface by the apparatus, a presentation of topics determined based on the topology; and
    receiving, via the user interface by the apparatus, a third input from the user specifying a subset of the topics, wherein the topic icons correspond to the subset of the topics.

3. A method of claim 1, further comprising:
    associating one of the topics and subtopics of the hierarchy with one or more reference documents; and
    extracting a set of reference noun tokens from the reference documents,
    wherein the generating of the topology comprises, at least in part, matching the extracted noun tokens with the set of reference noun tokens and associating the extracted noun tokens with the one topic or subtopic based on the matching.

4. A method of claim 3, further comprising:
    translating the topics and subtopics to another language;
    associating another one of the topics and subtopics of the hierarchy with one or more reference documents in the another language; and
    extracting another set of reference noun tokens specific to the another language;
    wherein the generating of the topology further comprises, at least in part, matching the extracted noun tokens with the another set of reference noun tokens in the another language.

5. A method of claim 1, further comprising:
    calculating an entropy associated with the topology, wherein the entropy is a measure of a variety of the topics and subtopics matched to the matching pertinent tokens in the topology, wherein the apparatus is a network node, and the one or more search results are provided to the user interface via a web portal.

6. A method of claim 1, wherein the topics and subtopics comprise user characteristics, interests, preferences, or a combination thereof, the method further comprising:
    causing, at least in part, assignment of the topology to a user profile associated with an application, a service, or combination thereof.

7. A method of claim 1, wherein the probabilistic model is a latent Dirichlet allocation that is aware of the topics and subtopics of the hierarchy.

8. A method of claim 1, further comprising:
    specifying a maximum number of the topics and subtopics of the hierarchy to match, wherein the topology is generated based, at least in part, on the maximum number;

customizing one or more applications, one or more services, or a combination thereof, to the user based, at least in part, on the topology; and transmitting the one or more applications, the one or more services, or a combination thereof to the user.

9. A method of claim 1, further comprising:

specifying a threshold probability for matching the extracted noun tokens with the topics and subtopics of the hierarchy, wherein the topology is generated based, at least in part, on the threshold probability.

10. An apparatus comprising:

at least one processor; and at least one memory including computer program code, the at least one memory and the computer program code configured to, with the at least one processor, cause the apparatus to perform at least the following, provide, on a user interface associated with the apparatus, a presentation of a menu of one or more topics from among a predetermined hierarchy of topics and subtopics to a user;

receive, via the user interface, a first input from the user specifying at least one of the one or more topics from among the predetermined hierarchy of topics and subtopics;

retrieve one or more documents associated with the user;

extract noun tokens from the documents based, at least in part, on the specified topics;

perform histogram processing of the extracted noun tokens to provide a list of pertinent tokens;

compare topic input information received from the user with the list of pertinent tokens to determine if there is a corresponding match;

generate a topology of the matching tokens according to a probabilistic model, wherein the topology matches the matching pertinent tokens with the topics and subtopics of the hierarchy;

provide, on the user interface, a presentation of top-level topics as topic icons on a tool bar on the user interface based, at least in part, on the topology of matching tokens; and in response to a second input from the user specifying one of the topic icons, provide, on the user interface, a presentation of one or more search results customized for the user using machine learning based on the topology.

11. An apparatus of claim 10, wherein the extracting of the noun tokens further causes the apparatus to:

identify substantially all noun tokens in the documents;

select one of the identified noun tokens based, at least in part, on whether the one identified noun token is semantically related to the specified topics, wherein the extracted noun tokens include the selected one identified noun token;

provide, on the user interface, a presentation of topics determined based on the topology; and receive, via the user interface, a third input from the user specifying a subset of the topics, wherein the topic icons correspond to the subset of the topics.

12. An apparatus of claim 10, wherein the apparatus is further caused to:

associate one of the topics and subtopics of the hierarchy with one or more reference documents; and extract a set of reference noun tokens from the reference documents, wherein the generating of the topology comprises, at least in part, matching the extracted noun tokens with the set of reference noun tokens and associating the extracted noun tokens with the one topic or subtopic based on the matching.

13. An apparatus of claim 12, wherein the apparatus is further caused to:

translate the topics and subtopics to another language;

associate another one of the topics and subtopics of the hierarchy with one or more reference documents in the another language; and extract another set of reference noun tokens specific to the another language;

wherein the generating of the topology further comprises, at least in part, matching the extracted noun tokens with the another set of reference noun tokens in the another language.

14. An apparatus of claim 10, wherein the apparatus is further caused to:

calculate an entropy associated with the topology, wherein the entropy is a measure of a variety of the topics and subtopics matched to the matching pertinent tokens in the topology.

15. An apparatus of claim 10, wherein the topics and subtopics comprise user characteristics, interests, preferences, or a combination thereof, and wherein the apparatus is further caused to:

causing, at least in part, assignment of the topology to a user profile associated with an application, a service, or combination thereof.

16. An apparatus of claim 10, wherein the probabilistic model is a latent Dirichlet allocation that is aware of the topics and subtopics of the hierarchy.

17. An apparatus of claim 10, wherein the apparatus is further caused to:

specify a maximum number of the topics and subtopics of the hierarchy to match, wherein the topology is generated based, at least in part, on the maximum number.

18. An apparatus of claim 10, wherein the apparatus is further caused to:

specify a threshold probability for matching the extracted noun tokens with the topics and subtopics of the hierarchy, wherein the topology is generated based, at least in part, on the threshold probability.

19. A non-transitory computer-readable storage medium carrying one or more sequences of one or more instructions which, when executed by one or more processors, cause an apparatus to at least perform the following:

providing, on a user interface associated with the apparatus, a presentation of a menu of one or more topics from among a predetermined hierarchy of topics and subtopics to a user;

receiving, via the user interface, a first input from the user specifying at least one of the one or more topics from among the predetermined hierarchy of topics and subtopics;

retrieving one or more documents associated with the user;

extracting noun tokens from the documents based, at least in part, on the specified topics;

performing histogram processing of the extracted noun tokens to provide a list of pertinent tokens;

comparing topic input information received from the user with the list of pertinent tokens to determine if there is a corresponding match;

generating a topology of the matching tokens according to a probabilistic model, wherein the topology matches the matching pertinent tokens with the topics and subtopics of the hierarchy;

providing, on the user interface, a presentation of top-level topics as topic icons on a tool bar on the user interface based, at least in part, on the topology of matching tokens; and in response to a second input from the user specifying one of the topic icons, providing, on the user interface, a presentation of one or more search results customized for the user using machine learning based on the topology.

20. A non-transitory computer-readable storage medium of claim 19, wherein the extracting of the language tokens causes the apparatus to further perform:

identifying substantially all noun tokens in the documents;

selecting one of the identified noun tokens based, at least in part, on whether the one identified language token is semantically related to the specified topics, wherein the extracted noun tokens include the selected one identified noun token;

providing, on the user interface, a presentation of topics determined based on the topology; and receiving, via the user interface, a third input from the user specifying a subset of the topics, wherein the topic icons correspond to the subset of the topics.

21. A method of claim 1, further comprising:

iteratively comparing each of the specified topics with the extracted noun tokens to determine if there is a corresponding match, wherein the iterative comparison is only performed with respect to any unmatched noun tokens.

* * * * *